United States Patent [19]
Silver et al.

[11] 4,277,707
[45] Jul. 7, 1981

[54] HIGH SPEED MAGNETIC COUPLING

[75] Inventors: Alexander Silver, Tarzana; Kenneth L. Wuertz, Torrance, both of Calif.

[73] Assignee: The Garrett Corporation, Los Angeles, Calif.

[21] Appl. No.: 899,669

[22] Filed: Apr. 24, 1978

[51] Int. Cl.³ .............................................. H02K 5/10
[52] U.S. Cl. .................................... 310/104; 417/420
[58] Field of Search .................. 417/420; 310/90, 156, 310/103, 104

[56] References Cited

U.S. PATENT DOCUMENTS

| | | | |
|---|---|---|---|
| 3,732,445 | 5/1973 | Laing | 417/420 X |
| 4,013,384 | 3/1977 | Oikawa | 417/420 X |
| 4,047,847 | 9/1977 | Oikawa | 417/420 X |
| 4,111,614 | 9/1978 | Martin et al. | 417/420 |
| 4,115,040 | 9/1978 | Knorr | 417/420 |

*Primary Examiner*—Donovan F. Duggan
*Attorney, Agent, or Firm*—Stuart O. Lowry; J. Richard Konneker; Albert J. Miller

[57] ABSTRACT

A permanent magnet coupling including high strength rare earth-cobalt permanent magnets retained under uniform compression during rotation.

32 Claims, 6 Drawing Figures

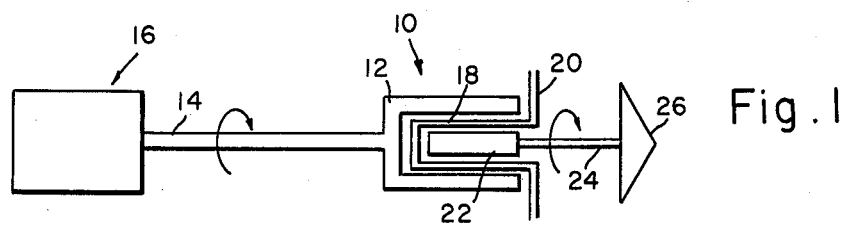
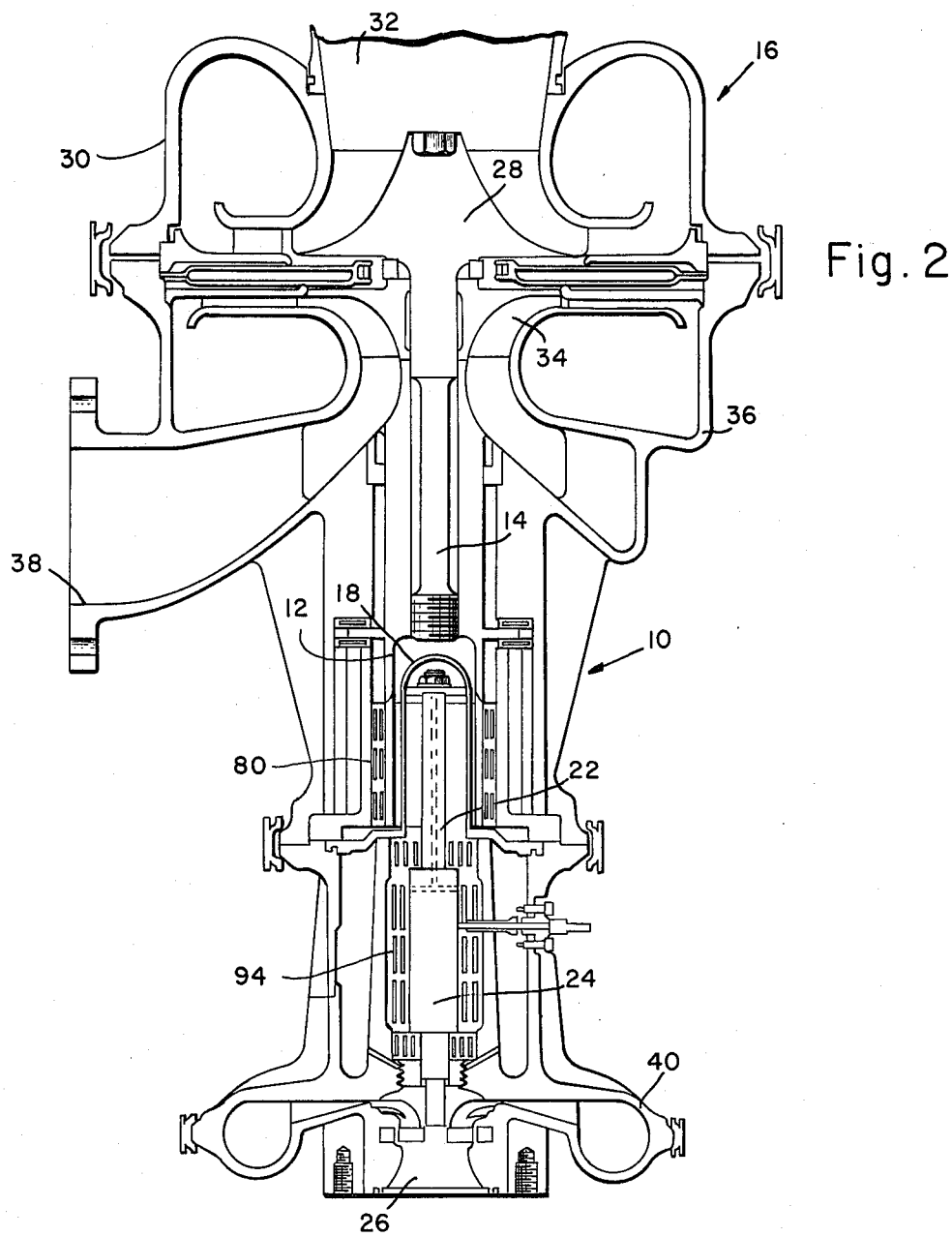

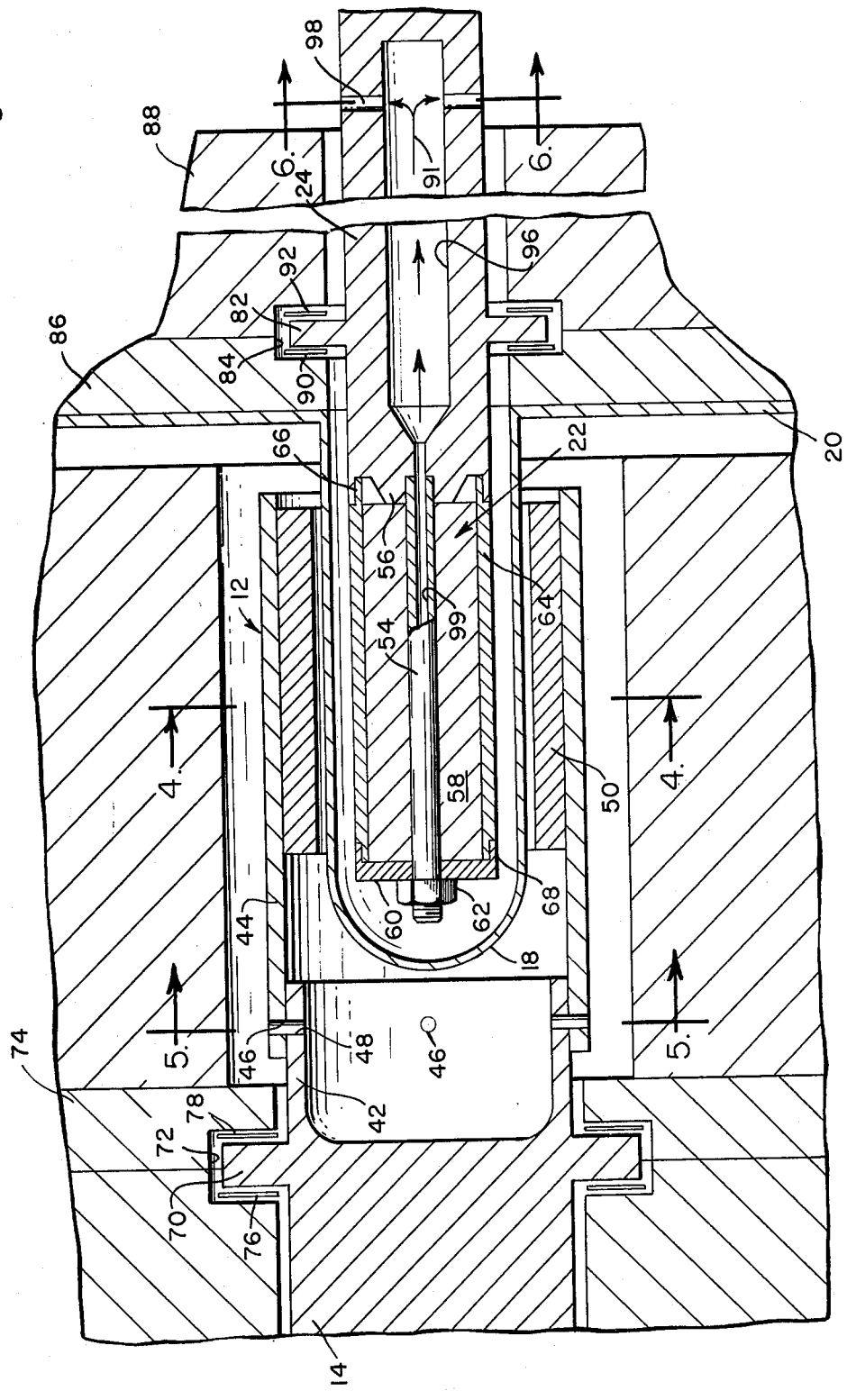

HIGH SPEED MAGNETIC COUPLING

BACKGROUND OF THE INVENTION

This invention relates to permanent magnet couplings. More specifically, this invention relates to a high strength permanent magnet coupling including samarium-cobalt magnets and mounting methods therefor.

Permanent magnet couplings are well known in the prior art, and typically comprise a pair of axially or radially opposed magnets or sets of magnets formed from a permanent magnet material, such as alnico. One of the permanent magnets is coupled to a driving member such as a motor, and the other permanent magnet is coupled to a driven member such as a pump impeller. The magnets are magnetically coupled to each other such that rotation of the driving member causes a corresponding rotation of the driven member to obtain the desired torque output. Couplings of this type are particularly advantageous wherein a hermetic seal or barrier is interposed between the driving and driven members, such as in a motor-driven freon compressor. In these applications, the hermetic seal assures against passage or leakage of any process fluid between the driving and driven members, and thereby prolongs the operating life of the equipment. For examples of prior art magnetic couplings, including hermetic seals or barriers, see U.S. Pat. Nos. 3,877,844; 3,826,938; 3,411,450; 3,512,903; 3,378,710; 3,249,777; 3,238,883; 3,238,878; 3,195,467; 2,970,548; 2,366,562; 2,230,717; and Re. 26,094.

During operation, a magnetic coupling may generate substantial quantities of heat due to relative slippage of the magnets at excessive torque loads, induction heating effects, and the like. This is particularly true with closely aligned, radially interfitting permanent magnets rotating at relatively high speeds such as on the order of about 100,000 rpm. Accordingly, prior art magnetic couplings typically have not been used with mechanical devices rotating at relatively high speeds so as to avoid any cooling requirement. However, some attempts have been made to cool a magnetic coupling, and have typically comprised methods of exposing at least a portion of one of the magnets to a cooling fluid. See, for example, U.S. Pat. Nos. 3,238,883; 3,238,878; and 3,267,868. These prior art devices have not, however, provided the requisite pumping or cooling action required with high speed rotating machinery such as turbomachines.

Another problem in the design of magnetic couplings is the prevention of demagnetization due to copling slippage at high speeds and/or high torque conditions. That is, with magnetic couplings, the maximum coupling torque available is limited to the magnetic and structural characteristics of the magnets. Typically, prior art permanent magnets constructed for structural integrity at high speeds have not provided a magnetic field of sufficient strength for slippage-free coupling under high torque conditions. Some permanent magnet materials capable of providing such high torque coupling, such as rare earth-cobalt magnets, have not been satisfactorily used because of structural brittleness. Specifically, a magnetic coupling has not been provided including high magnetic strength, structurally brittle magnets wherein cracking or breaking of the magnets due to centrifugal force effects at high speeds is prevented.

Prior art magnetic couplings have also encountered bearing design problems. That is, with low speed rotating devices, magnet-carrying shafts may be satisfactorily supported by relatively simple journal and thrust bearing structures such as sleeve bearings, ball bearings, and the like. However, as rotational speed increases, the problems of shaft stability and vibration correspondingly increase to create bearing design and cooling problems. Moreover, with increased speed, the adverse effects on the system due to incidental bearing magnetization and induction heating become substantial. Nevertheless, the prior art has consistently relied upon relatively conventional bearing structures for shaft support. See, for example, U.S. Pat. Nos. 3,512,903; 3,378,710; 3,195,467; 3,238,878; 2,970,548; and 2,366,562. Accordingly, permanent magnet couplings in the prior art have not been widely or satisfactorily used in high speed applications.

This invention overcomes the problems and disadvantages of the prior art by providing an improved permanent magnet coupling particularly for use with relatively high speed rotating machinery. In particular, the invention includes relatively brittle, high magnetic strength samarium-cobalt permanent magnets mounted for structural integrity under high speed rotating conditions.

SUMMARY OF THE INVENTION

In accordance with the invention, a high speed permanent magnet coupling comprises a generally cup-shaped outer coupling member rotatably driven by a suitable driving source such as a motor. The outer coupling member is concentrically received over a projecting portion of a hermetically sealed wall or barrier configured for close reception within the outer coupling member without physical contact therewith. An inner coupling member is concentrically received within the projecting portion of the sealed wall and thereby also concentrically within the outer coupling member. The inner coupling member is coupled to a driven shaft for transmitting rotational movement through the hermetically sealed wall to a suitable driven source, such as a compressor impeller.

The outer and inner coupling members each include a plurality of axially elongated permanent magnets formed from a high strength rare earth-cobalt permanent magnet material such as samarium-cobalt. More specifically, the members each include a like number of magnets each having an arcuate cross section and circumferentially arranged within a cylindrical sleeve. The outer and inner sets of magnets are disposed for magnetic coupling with each other whereby, upon rotation of the outer coupling member, the inner coupling member correspondingly rotates. Importantly, the sleeves of the outer and inner coupling members serve to maintain the sets of magnets under compression during rotation to maintain the structural integrity of said magnets.

The cylindrical sleeves of the outer and inner coupling members are each formed separately from their respective driving or driven shaft. More specifically, the sleeve on the outer coupling member is mounted exteriorly on the end of the driving shaft as by a plurality of press-fit pins, and the sleeve on the inner coupling member is centrifugally retained by peripheral flanges on the driven shaft, and on an end plug. With this construction, the sleeves undergo substantially uniform thermal and/or centrifugal expansion along their lengths when the coupling is rotated, so that the sets of magnets are maintained under substantially uniform compression at all times.

The inner driven coupling member is carried in a region of a process fluid such as freon, and includes a process fluid flow path so that process fluid may be circulated into close proximity with the magnets to cool the same during operation. More specifically, the driven shaft includes axial and radial passages adapted for centrifugally pumping the process fluid to cause circulatory flow adjacent the magnets. If desired, the inner coupling member may be rotationally and axially supported by process fluid bearings, such as foil bearings, disposed in the process fluid flow path whereby the bearings are cooled and lubricated by the circulating fluid.

BRIEF DESCRIPTION OF THE DRAWINGS

The accompanying drawings illustrate the invention. In such drawings:

FIG. 1 is a schematic illustration of a magnetic coupling;

FIG. 2 is a vertical section of a permanent magnet coupling of this invention;

FIG. 3 is an enlarged fragmented vertical section of a portion of FIG. 2;

DETAILED DESCRIPTION OF THE PREFERRED EMBODIMENT

Figure 4:
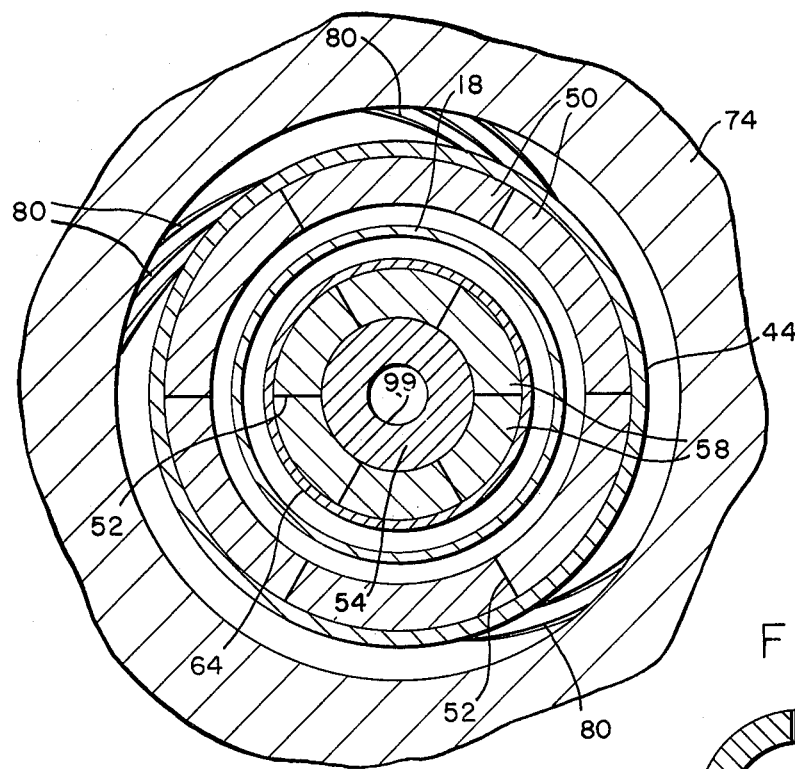
FIG. 4 is an enlarged fragmented vertical section taken on the line 4—4 of FIG. 3.

A magnetic coupling 10 is shown generally in FIG. 1 comprising a generally cup-shaped outer driving member 12 coupled to one end of a driving shaft 14 which is suitably driven rotatably by power source 16 such as a motor, engine, or the like. The cup-shaped driving member 12 is concentrically received over a projection 18 formed in an hermetically sealed wall 20 providing a barrier between components of the magnetic coupling. An inner driven member 22 is concentrically received within the wall projection 18 opposite the driving member 12 and in magnetic coupling relationship therewith, whereby rotational movement of the driving member 12 imparts corresponding rotational movement to the driven member 22. The driven member 22 rotatably drives a driven shaft 24 which, in turn, drives a driven element 26 such as a freon compressor impeller. In this manner, the compressor 26 is rotatably driven by the power source 16 in a positive leak-free manner without the use of mechanical shaft seals or the like therebetween.

A preferred system incorporating a permanent magnet coupling 10 of this invention is illustrated in FIG. 2. As illustrated, the power source 16 may include a turbine wheel 28 carried in a turbine housing 30 for receiving hot exhaust gases from a suitable combustor of a power turbine or other motive source (not shown). The exhaust gases rotatably drive the turbine wheel 28 before discharging through an exhaust gas outlet 32. The turbine wheel 28 couples high speed rotational movement via the driving shaft 14 to a compressor impeller 34. The compressor impeller 34 is suitably carried in a compressor housing 36, and rotation of the impeller 34 serves to draw air into the housing 36 through an inlet 38 for compression and subsequent discharge to the air intake of the power source combustor (not shown), all in a well known manner.

The driving shaft 14 forming the common shaft for the turbine wheel 28 and the compressor impeller 34 also forms the driving shaft for the magnetic coupling 10 of this invention. More specifically, the driving shaft 14 extends from the impeller 34 toward the coupling 10, and is connected as will be hereafter described in detail to the outer driving member 12. The outer member 12 magnetically couples through the hermetically sealed wall 18 to the inner driven member 22, which is coupled as will be hereafter described to the driven shaft 24. The driven shaft 24 in turn connects to the driven element 26 comprising a freon compressor impeller suitably carried in a region of a process fluid such as freon in a freon compressor housing 40.

The magnetic coupling 10 is shown in more detail in FIGS. 3 through 6. As shown, the driving shaft 14 terminates in a peripheral flange 42 projecting axially toward the projection 18 of the hermetically sealed wall 20. A cylindrical sleeve 44 is concentrically and snugly received over flange 42, and projects from the flange 42 concentrically about the projecting portion 18 of the sealed wall 20. Thus, the driving shaft 14 and the sleeve 44 together form the generally cup-shaped outer driving member 12. Importantly, the sleeve 44 is secured to the shaft flange 42 as by a plurality of circumferentially spaced pins 46 received in press-fit relation through a corresponding plurality of aligned openings 48. In this manner, upon rotation of the driving shaft 14, the sleeve 44 is able to expand radially as needed uniformly along its length to account for any effects due to thermal and/or centrifugal expansion.

A plurality of permanent magnets 50 are carried internally within the sleeve 44. In the preferred embodiment, these permanent magnets 50 comprise a series of axially elongated permanent magnets formed from samarium-cobalt to have a relatively high magnetic strength. Each of the magnets 50 has an arcuate cross section so as to form a circular series of magnets when contained within the sleeve 44, as shown in FIG. 4. If desired, a suitable gap filler material 52 may be interposed between adjacent magnets 50 to separate the magnets from each other and to assure proper anchoring within the sleeve. Of course, while six of the magnets 50 are shown in the drawings, it should be understood that the number of magnets is a choice of design. Importantly, when the driving member 12 is rotated, the magnets 50 are all retained under uniform compression by the sleeve 44.

The permanent magnets 50 within the sleeve 44 define an inner diameter for the driving member 12 sized for close reception over the projecting portion 18 of the hermetically sealed wall 20 without physical contact therewith. Importantly, the sealed wall 20 provides a barrier impervious to process fluid on either side thereof, and thereby allows a positive leak-free coupling of rotational motion. This sealed wall 20 may be formed from any of a wide variety of materials, such as stainless steel, or an electrically resistive material such as a suitable ceramic. The thickness of the projecting portion 18 of the wall is determined by the structural rigidity necessary to withstand the operating pressures of process fluids, and by the radial spacing necessary between the outer and inner members 12 and 22 for the desired magnetic torque coupling. Importantly, with samarium-cobalt magnets, the wall portion 18 may be thicker than when prior art magnets such as alnico are used because of the higher magnetic strength of samarium-cobalt magnets.

The driven member 22 is concentrically received within the projecting portion 18 of the hermetically sealed wall 20, and thereby also concentrically within the outer driving member 12. The driven member 22 comprises a tubular extension 54 of the driven shaft 24 projecting into the wall portion 18. The tubular extension 54 bears against an axially extending boss 56 formed on the end of the driven shaft 24, and extends therefrom into the wall portion 18 terminating near the axial extent of said wall portion. A plurality of permanent magnets 58 each comprising an axially elongated magnet formed from samarium-cobalt are radially arranged about the tubular extension 54, and are retained axially between the shaft boss 56 and an end plug 60 slidably received over the tubular extension 54. Importantly, the magnets 58 each have an arcuate cross section to peripherally surround the tubular extension 54, and correspond in number, length, and general magnetic properties to the magnets 50 carried on the outer driving member 12. The magnets 58 and the end plug 60 are axially retained on the tubular extension 54 as by a nut 62 threadably received over the end of said extension 54.

A peripheral sleeve 64 radially contains the permanent magnets 58 on the inner driven member 22. As shown, the sleeve 64 wraps around the series of magnets 58, and extends axially between the driven shaft 24 and the end plug 60. The sleeve 64 is conveniently secured in position by receiving the ends thereof concentrically within the bounds of facing peripheral flanges 66 and 68 formed respectively on the driven shaft 24 and the end plug 60. Importantly, the magnets 58 on the inner coupling member 22 are positioned in close magnetic coupling relation with the magnets 60 on the outer coupling member 12. In this manner, rotation of the outer magnets 50 causes a corresponding rotation of the inner magnets 58 without physical contact with the sealed wall 20, and thereby also rotates the driven shaft 24 and the driven element 26. The sleeve 64 radially restraining the inner magnets 58 maintains those magnets under substantially uniform compression during such rotation regardless of effects due to thermal and/or centrifugal expansion.

The permanent magnet coupling 10 of this invention is readily adapted for use with process fluid bearings. That is, as shown in the drawings, the driving shaft 14 includes a radially projecting peripheral flange 70 received in an annular recess 72 formed between the power source compressor housing 36 and a housing 74 enclosing the outer driving member 12. Process fluid thrust bearings 76 and 78 are interposed between the faces of the flange 70 and adjacent housing surfaces to control axial shaft movement. From the flange 70, the outer coupling member 12 extends toward the sealed wall within the housing 74. The sleeve 44 of the coupling member 12 is supported for smooth rotation by a series of process fluid journal bearings 80 carried within said housing 74. In the preferred embodiment, these process fluid thrust bearings 76 and 78 and journal bearings 80 are hydrodynamic bearings of the foil bearing type disclosed and described in U.S. Pat. Nos. 3,215,480; 3,366,427; 3,375,046; 3,382,014; 3,434,762; 3,615,121; 3,635,534; 3,642,331; 3,677,612; 3,893,733; 3,951,474 and 3,957,317, all assigned to the assignee of this application. The specific construction and mounting of these bearings is believed to be well documented by the referenced patents and therefore is not described in detail herein.

The driven shaft 24 is also desirably supported for relatively high speed rotation by suitable process fluid journal and thrust bearings. That is, the driven shaft 24 includes a radially projecting peripheral flange 82 received in an annular recess 84 defined by suitable housing members 86 and 88 provided for enclosing the driven element 26. The opposed faces of the flange 82 are separated from the adjacent housing members by suitable process fluid thrust bearings 90 and 92. Similarly, the driven shaft 24 is rotationally supported with respect to the housing member 88 by a series of suitable process fluid journal bearings 94. Importantly, in the preferred embodiment, these process fluid thrust bearings 90 and 92, and journal bearings 94 also comprise hydrodynamic bearings generally of the foil bearing type as disclosed and described in the above referenced U.S. patents.

Figure 6:
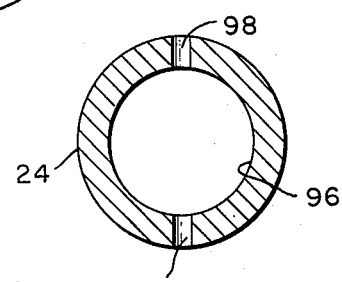
FIG. 6 is an enlarged fragmented vertical section taken on the line 6—6 of FIG. 3.
Figure 5:
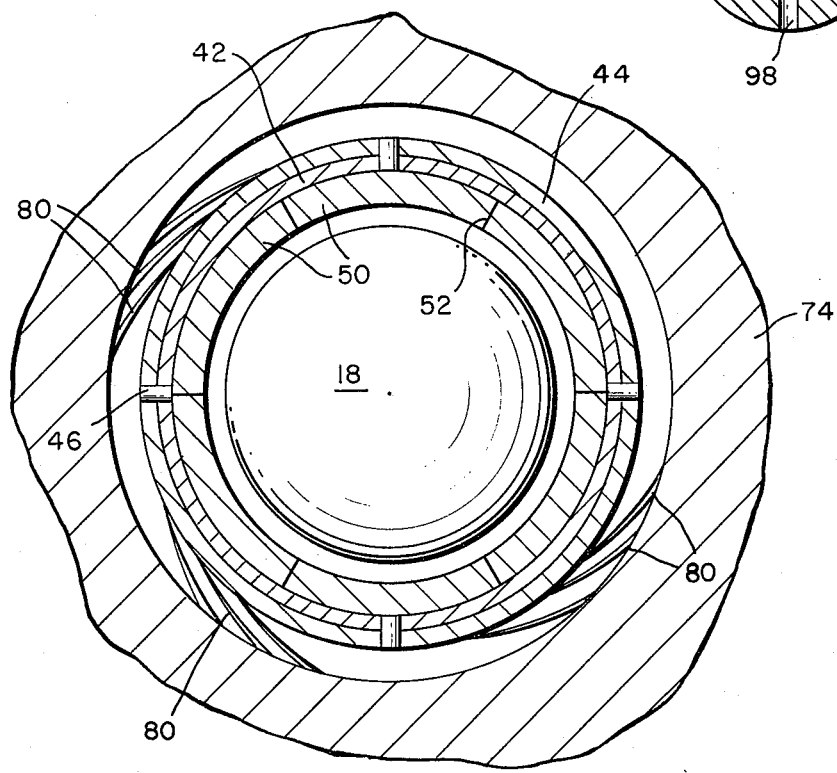
FIG. 5 is an enlarged fragmented vertical section taken on the line 5—5 of FIG. 3.

As shown in FIGS. 3 and 6, the driven member 22 and the driven shaft 24 include a process fluid flow path illustrated by arrows 91 for cooling the permanent magnets during operation. Moreover, the process fluid bearings 90, 92, and 94 are conveniently disposed along the flow path 91 so that the process fluid is also supplied to these bearings. More specifically, the flow path 91 is defined by a longitudinally extending bore 96 formed in the driven shaft 24 and communicating with a region of a process fluid, such as freon, via a pair of outwardly radiating opposed ports 98 formed in the shaft 24 between the housing member 88 and the driven element 26. The bore 96 extends through the shaft 24 and aligns with a passage 99 formed through the tubular extension 54 and communicating with the sealed wall portion 18. In operation, upon rotation of the shaft 24, the process fluid is centrifugally pumped out of the bore 96 through the ports 98 into the process fluid region. This induces a process fluid circulation through the bearings 94, 92, and 90, and further across the surfaces of the hermetically sealed wall portion 18 and the inner coupling member 22 into the bore 96 via the tubular extension passage 99. In this manner, the process fluid bearings are effectively and continuously lubricated and cooled, and the heat generated by the sets of magnets 50 and 58 is carried away by the process fluid to allow high speed coupling operation without overheating.

The permanent magnet coupling of this invention is operable under relatively high speed and high torque load conditions without adverse bearing or heating problems. Moreover, the coupled sets of permanent magnets are maintained under substantially uniform compressive forces during operation to maintain structural integrity of the magnets. Of course, various modifications of the invention are possible, but are believed to be within the skill of the art and thus contemplated by the description herein. For example, if desired, circulation of a process fluid such as air or oil may be provided for the driving member 12 and the associated process fluid bearings 76, 78 and 80. Such a modification to the combination of this invention would be generally as described in U.S. patent application Ser. No. 899,668 filed concurrently with this application in the name of Alexander Silver.

What is claimed is:

1. A magnetic coupling for coupling rotational motion through a sealed wall comprising rotatable driving means on one side of the sealed wall; first magnetic means having a longitudinal axis parallel with the axis of said driving means; first means for mounting said first magnetic means on said driving means and for maintaining the same under centrifugal compression along the entire axial length thereof upon rotation of said driving means; rotatable driven means axially aligned with said driving means on the opposite side of the sealed wall; second magnetic means having a longitudinal axis parallel with the axis of said driven means; and second means for mounting said second magnetic means on said driven means in magnetic coupling relation with said first magnetic means, and for maintaining said second magnetic means under centrifugal compression along the entire axial length thereof upon rotation of said driven means.

2. A magnetic coupling as set forth in claim 1 wherein said first and second magnetic means comprise concentric magnets respectively mounted on said driving means and said driven means.

3. A magnetic coupling as set forth in claim 2 wherin said driving means, first magnetic means, and first means combine to form a generally cup-shaped outer driving member; and said driven means, second magnetic means, and second means combine to form an inner driven member concentrically received within said cup-shaped outer member, said sealed wall being configured to fit concentrically between said inner and outer members.

4. A magnetic coupling as set forth in claim 1 wherein at least one of said first and second magnetic means comprises at least one samarium-cobalt magnet.

5. A magnetic coupling as set forth in claims 1 or 4 wherein at least one of said magnetic means comprises a plurality of axially elongated magnets, and the associated mounting means comprises an axial sleeve internally carrying said magnets for maintaining said magnets under centrifugal compression during rotation.

6. A magnetic coupling as set forth in claim 1 wherein said first means comprises a first axial sleeve; said first magnetic means comprising a first plurality of axially extending magnets carried within said first sleeve circumferentially about the inner diameter of said first sleeve; said second means comprising a second axial sleeve disposed concentrically with respect to said first sleeve and first plurality of magnets; and said second magnetic means comprising a second plurality of axially extending magnets carried within said second sleeve circumferentially about the inner diameter of said second sleeve.

7. A magnetic coupling as set forth in claims 1 or 6 wherein said first and second pluralities of magnets each comprise a like number of magnets each including at least one samarium-cobalt magnet.

8. A magnetic coupling as set forth in claim 6 wherein said second axial sleeve is disposed concentrically within said first sleeve and first plurality of magnets.

9. A magnetic coupling as set forth in claim 6 wherein at least one of said first and second axial sleeves is received exteriorly over one end of the associated rotatable means, and including means for connecting said one of said sleeves to the associated one of said rotatable means.

10. A magnetic coupling as set forth in claim 9 wherein said first axial sleeve is received exteriorly over one end of said driving means, said driven means including a pair of peripheral flanges received concentrically over the opposite ends of said second axial sleeve for radially containing said second sleeve, said second sleeve being disposed concentrically within said first sleeve.

11. A magnetic coupling as set forth in claim 1 wherein one of said rotatable means is disposed within a region of a process fluid, and includes radially and axially extending passages for centrifugally establishing process fluid circulation over the magnetic means mounted thereon.

12. A magnetic coupling as set forth in claim 11 wherein said one of said rotatable means includes at least one outwardly radiating port disposed on the side of the associated magnetic means opposite the wall, and a longitudinally extending central bore communicating between the wall and the port whereby process fluid is centrifugally pumped upon rotation out of the bore through the port to cause fluid circulation over the associated magnetic means and into the bore.

13. A magnetic coupling as set forth in claim 11 wherein said second magnetic means is disposed concentrically within said first magnetic means, and said driven means comprises said one rotatable means.

14. A magnetic coupling as set forth in claim 12 including process fluid bearings for supporting said one rotatable means, said bearings being disposed between said port and the wall so that fluid is circulated through said bearings.

15. A magnetic coupling for coupling rotational motion through a sealed wall comprising rotatable driving means on one side of the sealed wall; first samarium-cobalt magnetic means; first means for mounting said first samarium-cobalt magnetic means on said driving means and for maintaining the same under centrifugal compression upon rotation of said driving means; rotatable driven means axially aligned with said driving means on the opposite side of the sealed wall; second samarium-cobalt magnetic means; and second means for mounting said second samarium-cobalt magnetic means on said driven means in magnetic coupling relation with said first samarium-cobalt magnetic means, and for maintaining said second samarium-cobalt magnetic means under centrifugal compression upon rotation of said driven means.

16. A magnetic coupling as set forth in claim 15 wherein said first means comprises a first axial sleeve received exteriorly over one end of said driving means, and means for connecting said first sleeve to said driving means to allow relative and substantially uniform radial expansion of said first sleeve; said first samarium-cobalt magnetic means comprising a first plurality of samarium-cobalt magnets radially contained within said first sleeve; said second means comprising a second axial sleeve having its opposite ends radially contained by facing peripheral flanges on said driven means; and said second samarium-cobalt magnetic means comprising a second plurality of samarium-cobalt magnets radially contained within said second sleeve and corresponding in number to the number of magnets of said first plurality, said second magnets and second sleeve being concentrically received within said first magnets and first sleeve.

17. A magnetic coupling for coupling rotational motion through a sealed wall comprising a rotatable driving shaft on one side of the wall; first samarium-cobalt magnetic means; an axial first sleeve having one end received over one end of said driving shaft and radially containing said first samarium-cobalt magnetic means under centrifugal compression during rotation; connecting means for connecting said first sleeve to said driving shaft to allow relative radial movement therebetween; a rotatable driven shaft on the other side of said wall; second samarium-cobalt magnetic means; and a second axial sleeve secured to said driven shaft and radially containing said second samarium-cobalt magnetic means under centrifugal compression during rotation, said first sleeve and first magnetic means being concentrically disposed with respect to said second sleeve and second magnetic means.

18. A magnetic coupling as set forth in claim 17 wherein said second sleeve and second magnetic means is disposed concentrically within said first sleeve and first magnetic means.

19. A magnetic coupling as set forth in claims 16 or 18 wherein said driven means is disposed within a region of a process fluid, and includes radially and axially extending passages for centrifugally establishing process fluid circulation over said second magnetic means.

20. A magnetic coupling as set forth in claim 19 including process fluid bearings for supporting said driven means, said bearings being disposed between said port and the wall so that fluid is circulated through said bearings.

21. A magnetic coupling as set forth in claim 17 including a pair of opposed peripheral flanges on said driven shaft for concentric reception over the opposite ends of said second sleeve for radially containing said second sleeve.

22. A method of magnetically coupling rotational motion through a sealed wall comprising the steps of providing rotatable driving means on one side of the wall; mounting first magnetic means on said driving means with a longitudinal axis parallel with the driving means, and maintaining said first magnetic means under centrifugal compression along the entire length thereof upon rotation; providing rotatable driven means on the opposite side of the wall axially aligned with the driving means; mounting second magnetic means on said driven means with a longitudinal axis parallel with the driven means and maintaining said second magnetic means under centrifugal compression along the entire length thereof upon rotation and in magnetic coupling relation with said first magnetic means.

23. The method of claim 22 including the step of positioning one of said first and second magnetic means concentrically within the other of said magnetic means.

24. The method of claim 22 wherein said step of mounting said first magnetic means comprises radially containing said first magnetic means within an axial sleeve, and mounting said sleeve on said driving means for allowing substantially uniform radial enlargement thereof along its axial length during rotation.

25. The method of claims 22 or 24 wherein said step of mounting said second magnetic means comprises radially containing said second magnetic means within axial second sleeve, and mounting said second sleeve on said driven means with its opposed ends radially contained by flange means on said driven means.

26. The method of claim 22 including the step of providing samarium-cobalt magnets for at least one of said first and second magnetic means.

27. A method of magnetically coupling rotational motion through a sealed wall comprising the steps of providing rotatable driving means on one side of the wall; mounting first samarium-cobalt magnetic means on said driving means and maintaining said first samarium-cobalt magnetic means under centrifugal compression upon rotation; providing rotatable driven means on the opposite side of the wall axially aligned with the driving means; mounting second samarium-cobalt magnetic means on said driven means concentrically within said first samarium-cobalt magnetic means and maintaining said second samarium-cobalt magnetic means under centrifugal compression upon rotation and in magnetic coupling relation with said first samarium-cobalt magnetic means.

28. The method of claim 27 wherein said step of mounting said first magnetic means comprises radially containing a plurality of axially extending magents within a first axial sleeve, and mounting said first sleeve on said driving means to allow relative radial movement therebetween; said step of mounting said second magnetic means comprising radially containing a like plurality of axially extending magnets with a second axial sleeve, and mounting said second sleeve on said driven means.

29. A method of magnetically coupling rotational motion through a sealed wall comprising the steps of providing a rotatable driving shaft on one side of the wall; radially containing first samarium-cobalt magnetic means within a first axial sleeve and maintaining said first magnetic means under centrifugal compression upon rotation; mounting said first sleeve on said first shaft to allow substantially uniform radial expansion along the axial length of said first sleeve; providing a rotatable driven shaft on the opposite side of the wall axially aligned with said driving shaft; radially containing second samarium-cobalt magnetic means within a second axial sleeve and maintaining said second magnetic means under centrifugal compression upon rotation; and mounting said second sleeve on said driven shaft disposed concentrically within said first sleeve.

30. The method of claims 23 or 27 or 29 including the steps positioning said driven means in a region of a process fluid, and forming radially and axially extending passages in said driven means for centrifugally establishing process fluid circulation over said second magnetic means.

31. The method of claim 30 including the step of supporting said driven means with process fluid bearings disposed with respect to the passages formed in said driven means so that fluid is circulated through the bearings.

32. A magnetic coupling for coupling rotational motion through a sealed wall comprising rotatable driving means on one side of the sealed wall; a first axially extending sleeve received exteriorly over one end of said driving means, said first sleeve and said driving means having formed therein a plurality of aligned radial openings; a plurality of circumferentially spaced pins received into said aligned openings for connecting said first sleeve to said driving means for relative radial expansion with respect thereto; a first plurality of axially extending magnets carried within said first sleeve circumferentially about the inner diameter thereof for maintenance of said first magnets under centrifugal compression upon rotation of said driving means and first sleeve; rotatable driven means axially aligned with said driving means on the opposite side of the sealed wall; a second axially extending sleeve rotatable with said driven means and disposed concentrically with respect to said first sleeve and first magnets; and a second plurality of axially extending magnets carried within said second sleeve circumferentially about the inner diameter thereof for maintenance of said second magnets under centrifugal compression upon rotation of said driven means and second sleeve.

* * * * *